US012553263B2

(12) United States Patent
Okawa et al.

(10) Patent No.: US 12,553,263 B2
(45) Date of Patent: Feb. 17, 2026

(54) DOOR LATCH DEVICE

(71) Applicant: MITSUI KINZOKU ACT CORPORATION, Yokohama (JP)

(72) Inventors: Shintaro Okawa, Yokohama (JP); Yasuyuki Watanabe, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 278 days.

(21) Appl. No.: 17/763,995

(22) PCT Filed: Nov. 25, 2020

(86) PCT No.: PCT/JP2020/043865
§ 371 (c)(1),
(2) Date: Mar. 25, 2022

(87) PCT Pub. No.: WO2021/131470
PCT Pub. Date: Jul. 1, 2021

(65) Prior Publication Data
US 2022/0316241 A1 Oct. 6, 2022

(30) Foreign Application Priority Data
Dec. 26, 2019 (JP) ................................ 2019-236973

(51) Int. Cl.
*E05B 77/34* (2014.01)
*E05B 81/06* (2014.01)
(Continued)

(52) U.S. Cl.
CPC .............. *E05B 77/34* (2013.01); *E05B 81/06* (2013.01); *E05B 81/14* (2013.01); *E05B 81/56* (2013.01); *E05B 85/02* (2013.01); *E05B 79/20* (2013.01)

(58) Field of Classification Search
CPC .......... E05B 77/34; E05B 81/06; E05B 81/14; E05B 81/56; E05B 85/02; E05B 79/20;
(Continued)

(56) References Cited

U.S. PATENT DOCUMENTS 4,932,277 A 6/1990 Beaux
5,028,084 A 7/1991 Fukumoto et al.
(Continued)

FOREIGN PATENT DOCUMENTS

CN 1782310 A 6/2006
CN 103883179 A 6/2014
(Continued)

*Primary Examiner* — Kristina R Fulton
*Assistant Examiner* — Thomas L Neubauer
(74) *Attorney, Agent, or Firm* — Foley & Lardner LLP

(57) ABSTRACT

A door latch device includes a motor, a mechanical mechanism, a door lock ECU, and a case. The door lock ECU includes a printed wiring board and a capacitor connected to the printed wiring board. The case includes a bottom plate, a first accommodation space for accommodating the motor and the mechanical mechanism on one side of the bottom plate, and a second accommodation space for accommodating the printed wiring board and the capacitor on the other side of the bottom plate. The bottom plate is provided with a capacitor accommodation portion recessed from the second accommodation space toward the first accommodation space and the capacitor is arranged in the capacitor accommodation portion.

6 Claims, 12 Drawing Sheets

(51) Int. Cl.

| | |
|---|---|
| ***E05B 81/14*** | (2014.01) |
| ***E05B 81/56*** | (2014.01) |
| ***E05B 85/02*** | (2014.01) |
| *E05B 79/20* | (2014.01) |

(58) Field of Classification Search

CPC .......... E05B 81/16; E05B 81/86; E05B 81/82; B60J 5/00

See application file for complete search history.

(56) References Cited

U.S. PATENT DOCUMENTS

| | | | | |
|---|---|---|---|---|
| 6,168,216 | B1 | 1/2001 | Nakajima et al. | |
| 10,047,548 | B2 * | 8/2018 | Zeabari | E05B 81/54 |
| 2001/0038211 | A1 | 11/2001 | Hayakawa et al. | |
| 2004/0004358 | A1 | 1/2004 | Arlt et al. | |
| 2004/0058563 | A1 | 3/2004 | Kobayashi et al. | |
| 2006/0103145 | A1 | 5/2006 | Ottolini et al. | |
| 2011/0084504 | A1 * | 4/2011 | Kurebayashi | E05B 81/20<br>292/99 |
| 2014/0175813 | A1 | 6/2014 | Margheritti et al. | |
| 2015/0021934 | A1 | 1/2015 | Barmscheidt et al. | |
| 2016/0230426 | A1 | 8/2016 | Taurasi et al. | |
| 2016/0273246 | A1 | 9/2016 | Margheritti et al. | |
| 2017/0245378 | A1 * | 8/2017 | Taurasi | H05K 5/0056 |
| 2018/0179788 | A1 | 6/2018 | Oxley et al. | |
| 2019/0136590 | A1 | 5/2019 | Patane et al. | |
| 2019/0271179 | A1 * | 9/2019 | Patane | E05B 81/36 |
| 2021/0032911 | A1 | 2/2021 | Ishiguro et al. | |
| 2021/0148143 | A1 * | 5/2021 | Ney | E05B 81/54 |

FOREIGN PATENT DOCUMENTS

| | | | |
|---|---|---|---|
| CN | 109763726 | A | 5/2019 |
| EP | 0 342 099 | A1 | 11/1989 |
| EP | 1 361 323 | A2 | 11/2003 |
| JP | H02-30868 | A | 2/1990 |
| JP | 2000-027514 | A | 1/2000 |
| JP | 2001-262903 | A | 9/2001 |
| JP | 2004-092204 | A | 3/2004 |
| JP | 2016-180216 | A | 10/2016 |
| JP | 6213927 | B2 | 10/2017 |
| JP | 2019-190019 | A | 10/2019 |
| WO | WO-2012/167771 | A2 | 12/2012 |

* cited by examiner

DOOR LATCH DEVICE

CROSS-REFERENCE TO RELATED APPLICATIONS

The present application claims priority under 37 U.S.C. § 371 to International Patent Application No. PCT/JP2020/043865, filed Nov. 25, 2020, which claims priority to and the benefit of Japanese Patent Application No. 2019-236973, filed on Dec. 26, 2019. The contents of these applications are hereby incorporated by reference in their entireties.

TECHNICAL FIELD

The present invention relates to a door latch device which closes and opens a vehicle door.

BACKGROUND ART

A door latch device of a vehicle is provided with a latch mechanism for latching and unlatch a striker provided on a main body side of the vehicle and a door is closed and opened by the latch mechanism.

Patent Literature 1 describes a door latch device which includes an electric release mechanism which can release meshing between a latch mechanism and a striker by power of a motor, a manual release mechanism which can release the meshing of the latch mechanism by manual operation force, and a lock mechanism which can be switched between a locked state which disables a release operation of the manual release mechanism and an unlocked state which enables the release operation of the manual release mechanism.

In such a door latch device, it is preferable that an emergency power supply means is equipped in the door latch device, in addition to a drive source (for example, 12 V battery) of the motor provided on a main body side of a vehicle. As a result, even when power cannot be properly supplied from the drive source of the motor, such as in the event of a vehicle collision, the lock mechanism is changed from the locked state to the unlocked state by the power from the emergency power supply means, and thus an occupant can get out of the vehicle by a release operation of the manual release mechanism.

Further, since such a door latch device is built in a door of the vehicle, the door latch device needs to be arranged so as not to obstruct a trajectory of a window glass. Therefore, various measures have been taken so far (for example, Patent Literatures 2 to 4).

CITATION LIST

Patent Literature

Patent Literature 1: JP-B-6213927
Patent Literature 2: JP-A-2000-027514
Patent Literature 3: JP-A-1990-030868
Patent Document 4: JP-A-2001-262903

SUMMARY OF INVENTION

Technical Problem

In order to prevent the door latch device from obstructing the trajectory of the window glass, it is preferable to reduce a size of the door latch device. Even when a power storage body such as a capacitor is placed inside the door latch device as an emergency power supply means, it is necessary to take measures to prevent the door latch device from becoming large.

The invention provides a miniaturized door latch device provided with a power storage body as an emergency power supply means.

Solution to Problem

The present invention is a door latch device which is provided in a door of a vehicle and closes and opens the door by latching and unlatching a striker provided on a main body side of the vehicle, the door latch device including: a motor; a mechanical mechanism which is driven by the motor; a door lock ECU configured to control the motor; and a case for accommodating the motor, the mechanical mechanism, and the door lock ECU, wherein the door lock ECU includes a printed wiring board and a power storage body connected to the printed wiring board, wherein the case has: a partition wall; a first accommodation space for accommodating the motor and the mechanical mechanism on one side of the partition wall; and a second accommodation space for accommodating the printed wiring board and the power storage body on the other side of the partition wall, wherein the partition wall is provided with a power storage body accommodation portion recessed from the second accommodation space toward the first accommodation space, and wherein the power storage body is placed in the power storage body accommodation portion.

Advantageous Effects of Invention

According to the invention, since the power storage body having a relatively large volume is placed in the power storage body accommodation portion recessed from the second accommodation space toward the first accommodation space, the door latch device can be miniaturized. As a result, it is possible to place the door latch device inside the door without obstructing a trajectory of a window glass.

DESCRIPTION OF EMBODIMENTS

Figure 1:
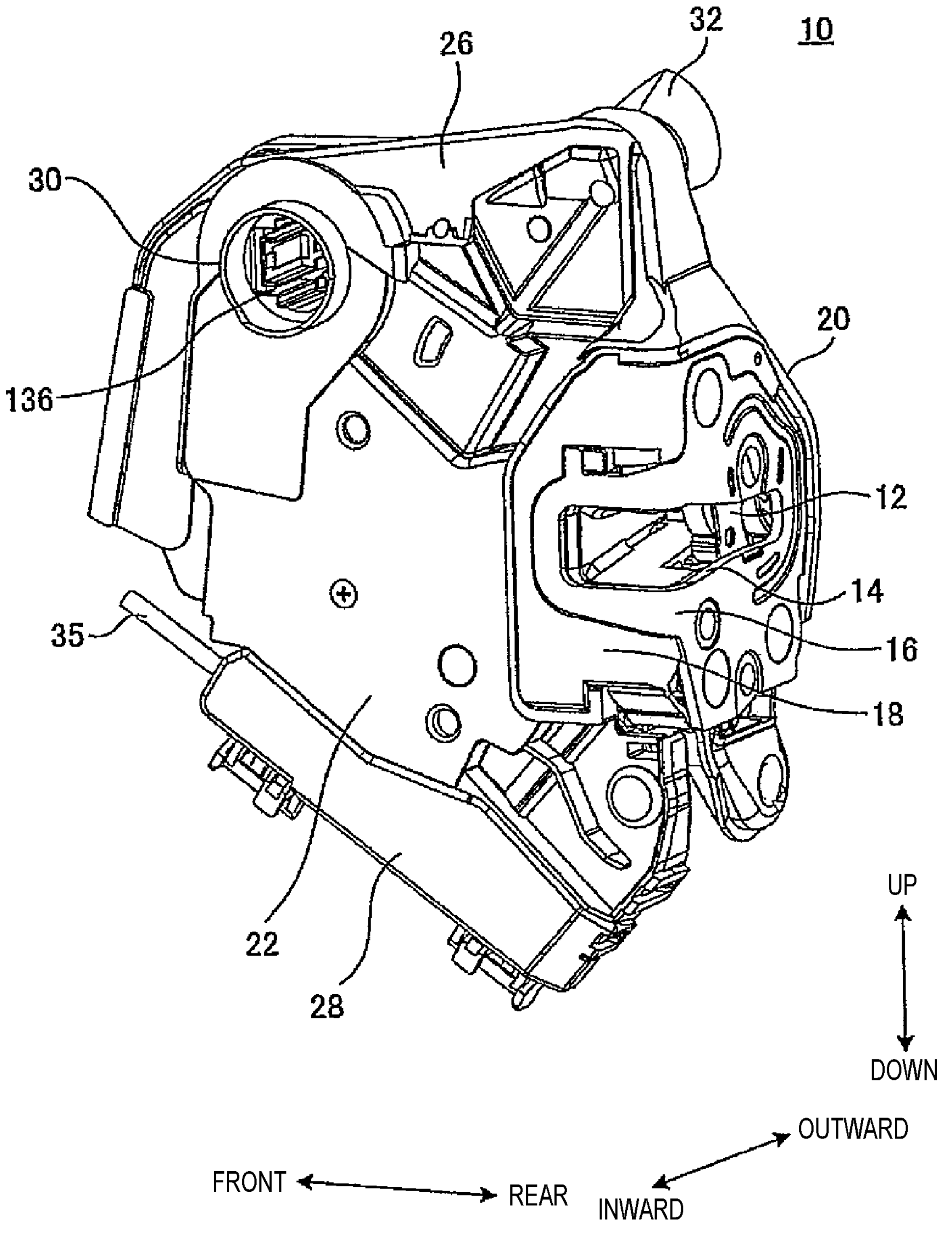
FIG. 1 is a perspective view of a door latch device according to an embodiment of the invention as viewed diagonally from the rear outside a vehicle.

Hereinafter, a door latch device according to an embodiment of the invention will be described in detail with reference to the drawings.

Hereinafter, notation of a direction in the description of a door latch device 10 is based on a vehicle. Directions based on the vehicle are indicated by arrows on the drawing as appropriate up and down, inside and outside (that is, indoor side and outdoor side), and front and back. In addition, notation of a rotation direction (clockwise direction, counterclockwise direction) of a rotating part basically follows the drawing referred to at that time. The door latch device 10 illustrated in each drawing exemplifies the one applied to a right door of the vehicle, but the one applied to a left door may have a symmetrical structure.

Figure 2:
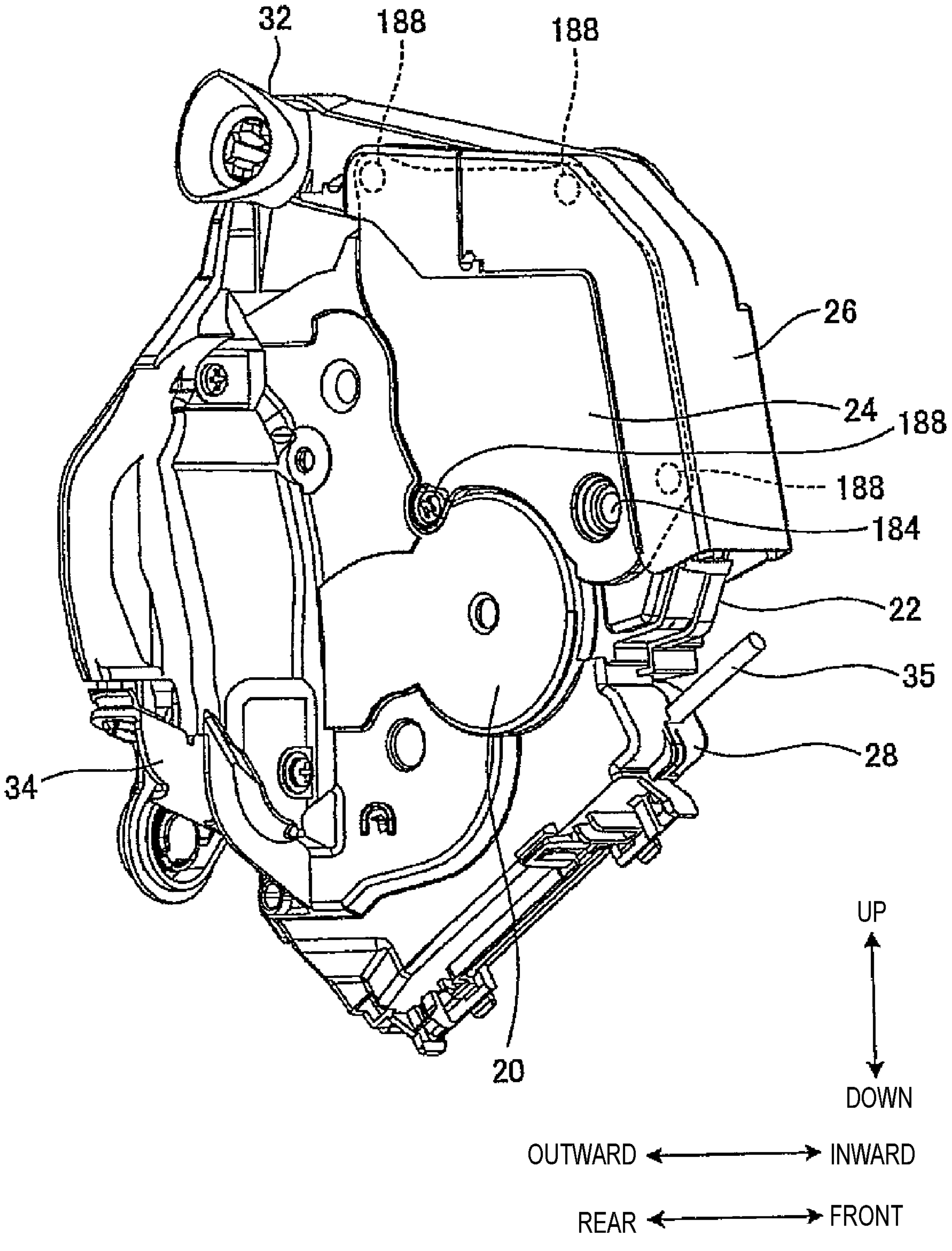
FIG. 2 is a perspective view of the door latch device of FIG. 1 as viewed diagonally from the front outside the vehicle.

FIG. 1 is a perspective view of the door latch device 10 according to the embodiment as viewed diagonally from the rear and FIG. 2 is a perspective view of the door latch device 10 as viewed diagonally from the front outside the vehicle.

The door latch device 10 is attached to the inside of a door of the vehicle and closes and opens the door by latching and unlatching a striker provided on a main body side of the vehicle. A door on which the door latch device 10 is provided to latch the striker is, for example, a side door of the vehicle, but the "door" has a broad meaning and may be applied to a bonnet, a trunk lid, a tailgate, or the like. First, a schematic overall configuration of the door latch device 10 will be described.

As illustrated in FIGS. 1 and 2, in the door latch device 10, a latch 12 for latching the striker is provided in a back side of a striker entry groove 14. The latch 12 is a part of a latch mechanism 44 which holds the door in a closed state by latching the striker described below. The striker entry groove 14 is formed as a part of a cover plate 16. A body 18 is provided around the cover plate 16. The inside and the rear side of the latch mechanism 44 are covered by the cover plate 16 and the body 18.

The door latch device 10 is covered with a case 20, a first cover 22, and a second cover 24 in addition to the cover plate 16 and the body 18 described above. The case 20 mainly covers the outside, the first cover 22 mainly covers the inside, and the second cover 24 further covers a front upper portion of the inside of the case 20. The cover plate 16, the body 18, the case 20, the first cover 22 and the second cover 24 form a housing of the door latch device 10.

The door latch device 10 further includes a waterproof cover 26 which covers an upper surface, a cable cover 28 which is located lower inside, a coupler 30 which is provided on an inner upper portion, and a key cylinder connecting portion 32 which is provided on an outer upper portion. The waterproof cover 26 covers a boundary between the case 20 and the first cover 22 to prevent water droplets from entering. The cable cover 28 covers a part which is connected to a cable 35. The cable 35 is connected to an inner handle (not illustrated). A harness connector (not illustrated) is connected to the coupler 30. A sponge may be provided around the coupler 30. The key cylinder connecting portion 32 is a part where a key is inserted and operated. An end portion of an outer lever 34 connected to an outer handle (not illustrated) is exposed on an outer surface of the door latch device 10.

Figure 3:
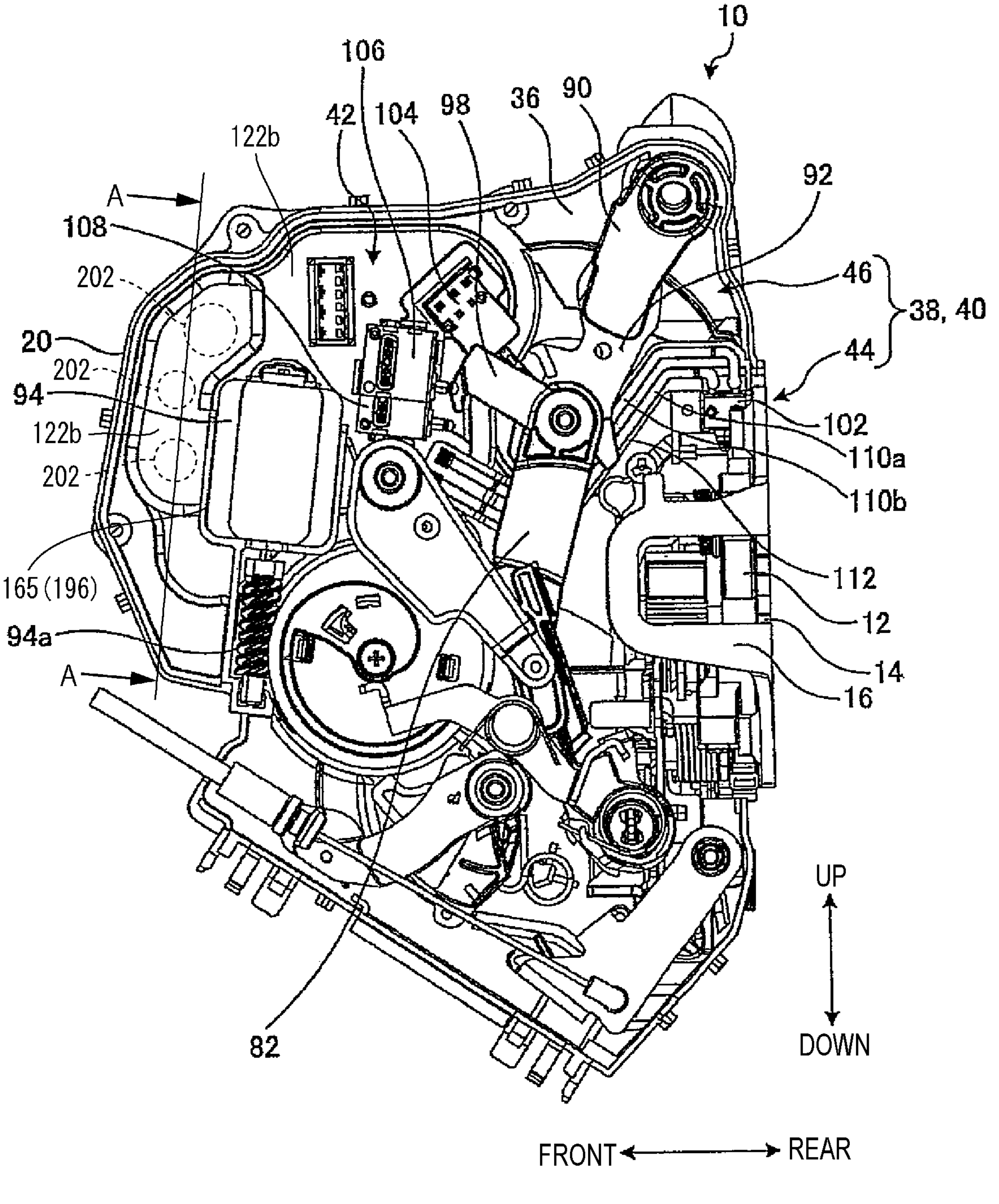
FIG. 3 is a side view illustrating an inside of the door latch device of FIG. 1.

FIG. 3 is a side view illustrating the inside of the door latch device 10. FIG. 3 illustrates the door latch device 10 with the body 18, the first cover 22, the waterproof cover 26, and the cable cover 28 removed.

As illustrated in FIG. 3, a first accommodation space 36 is formed inside the door latch device 10. The first accommodation space 36 is an area where the outside is covered with the case 20 and the inside is mainly covered with the first cover 22. In addition to the first cover 22, the inside of the first accommodation space 36 is covered with the cover plate 16, the body 18, and the cable cover 28.

The first accommodation space 36 can be roughly divided into a mechanism area 40 in which a mechanical mechanism 38 is placed and an electric component area 42 in which the electric component is placed. The electrical component area 42 occupies a front upper portion and the mechanism area 40 occupies the remaining part thereof. The mechanical mechanism 38 has the latch mechanism 44 which latches and unlatches the striker by the latch 12 and a lock mechanism 46 which locks and unlocks the latch mechanism 44. The latch mechanism 44 is placed rearward in the first accommodation space 36 and is covered with the cover plate 16 and the body 18. In the door latch device 10, a second accommodation space 124 (see FIG. 10) is formed in addition to the first accommodation space 36. The second accommodation space 124 will be described below.

The mechanical mechanism 38 includes electric release means capable of releasing the latch mechanism 44 by power of a motor 94 and manual release means capable of releasing the latch mechanism 44 by a manual operation force. The electric release means is a means for unlatching the striker via the motor 94, a cam ring 76, and the like, which will be described below. The manual release means is a means for unlatching the striker via an outer lever 34 and an inner lever 59, which will be described below, which are mechanically interlocked with a manual operation.

Figure 4:
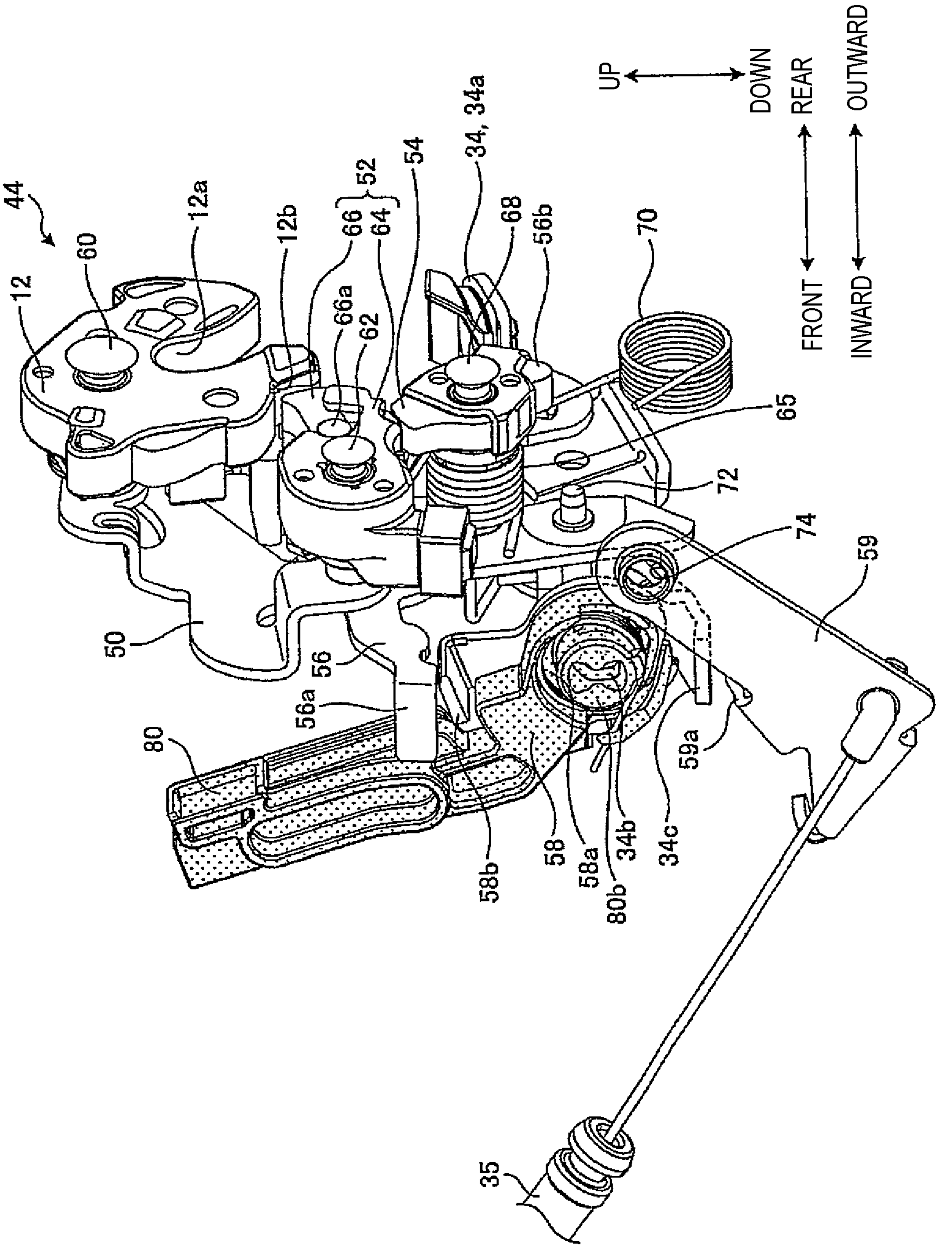
FIG. 4 is a perspective view of a latch mechanism.

FIG. 4 is a perspective view of the latch mechanism 44. As illustrated in FIG. 4, the latch mechanism 44 has a base bracket 50, a ratchet 52, a ratchet holder 54, a ratchet lever 56, an anti-panic lever 58, and the inner lever 59 in addition to the latch 12 and the outer lever 34 described above. Each element of the latch mechanism 44 is supported or pivotally supported by the base bracket 50.

The latch 12 is pivotally supported by a shaft portion 60 and includes a striker engaging groove 12*a* and a ratchet engaging portion 12*b*. The latch 12 rotates against a spring (not illustrated) as the striker enters the striker engaging groove 12*a* from the opened door state and the ratchet 52 engages with the ratchet engaging portion 12*b* to latch the striker at a full latch position, in such a manner that the door is closed.

The ratchet 52 has a base lever 64 pivotally supported by a shaft portion 62 and a pole lever 66 pivotally supported by a root shaft portion 66*a* with respect to the base lever 64. The base lever 64 is elastically urged by a spring 65. The pole lever 66 bends within a predetermined angle range with respect to the base lever 64. The ratchet 52 is supported from the side by the ratchet holder 54 to hold a substantially linear posture and a tip of the pole lever 66 engages with the ratchet engaging portion 12*b* to hold the latch 12 in the full latch position.

The ratchet holder 54 is pivotally supported by a shaft portion 68 and elastically urged by a spring 70 to support the sides of the base lever 64. The ratchet holder 54 rotates against an elastic force of the spring 70 based on an operation of the ratchet lever 56 to be separated from the base lever 64. Then, the base lever 64 and the pole lever 66 of the ratchet 52 are in a bent state with the root shaft portion 66*a* as a reference and the pole lever 66 is separated from the ratchet engaging portion 12*b* and the latch 12 is released. The latch 12 is rotated by an elastic force to unlatch the striker and open the door. By operating the ratchet 52 via the ratchet holder 54, it is possible to operate the ratchet 52 with a lighter force than when directly operating the ratchet 52.

The ratchet lever 56 is pivotally supported by the base bracket 50 and includes a passive portion 56*a* protruding farther inward than a rotation axis and an acting portion 56*b* protruding farther outward than the rotation axis. In the ratchet lever 56, the acting portion 56*b* rotates the ratchet holder 54 as the passive portion 56*a* moves upward.

The outer lever 34 is pivotally supported by a shaft portion 72 and has a handle operating portion 34*a* protruding farther outward than the shaft portion 72, an acting portion 34*b* protruding farther inward than the shaft portion 72, and a lever passive piece 34*c*. The handle operating portion 34*a* is a part operated by the outer handle. The acting portion 34*b* is inserted into a hole 58*a* of the anti-panic lever 58 and is a part acting on the anti-panic lever 58. The acting portion 34*b* is also inserted into a deformed hole 80*b* of an open link 80 described below. The lever passive piece 34*c* is located below the acting portion 34*b* and is operated by the inner lever 59. The outer lever 34 is rotated by the operation of the handle operating portion 34*a* or the lever passive piece 34*c* and pushes up the anti-panic lever 58.

The inner lever 59 is pivotally supported by a shaft portion 74 and is swung by the operation of the cable 35 and an operation piece 59*a* pushes up the lever passive piece 34*c*.

The anti-panic lever 58 includes the hole 58*a* into which the acting portion 34*b* is inserted and an acting piece 58*b* bent upwardly. The anti-panic lever 58 is pushed up by the acting portion 34*b* by the rotation of the outer lever 34 when an open link 80 described below is in an unlock position and the acting piece 58*b* pushes up the passive portion 56*a* of the ratchet lever 56. As a result, the ratchet holder 54 and the ratchet 52 perform an unlatch operation. The anti-panic lever 58 has a structure separate from the open link 80 due to the anti-panic mechanism.

Figure 5:
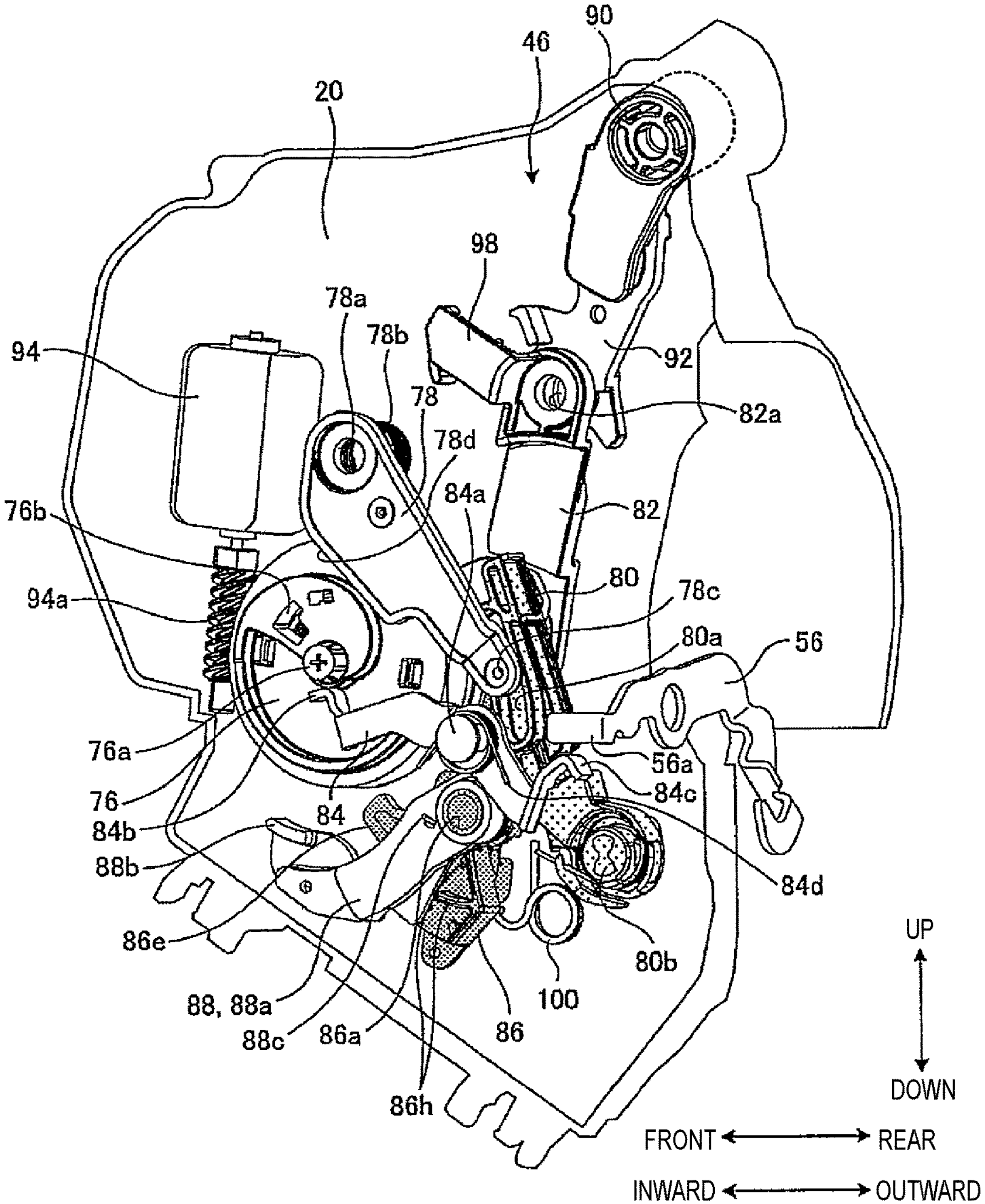
FIG. 5 is a perspective view of a lock mechanism as viewed diagonally from the inside rear.
Figure 6:
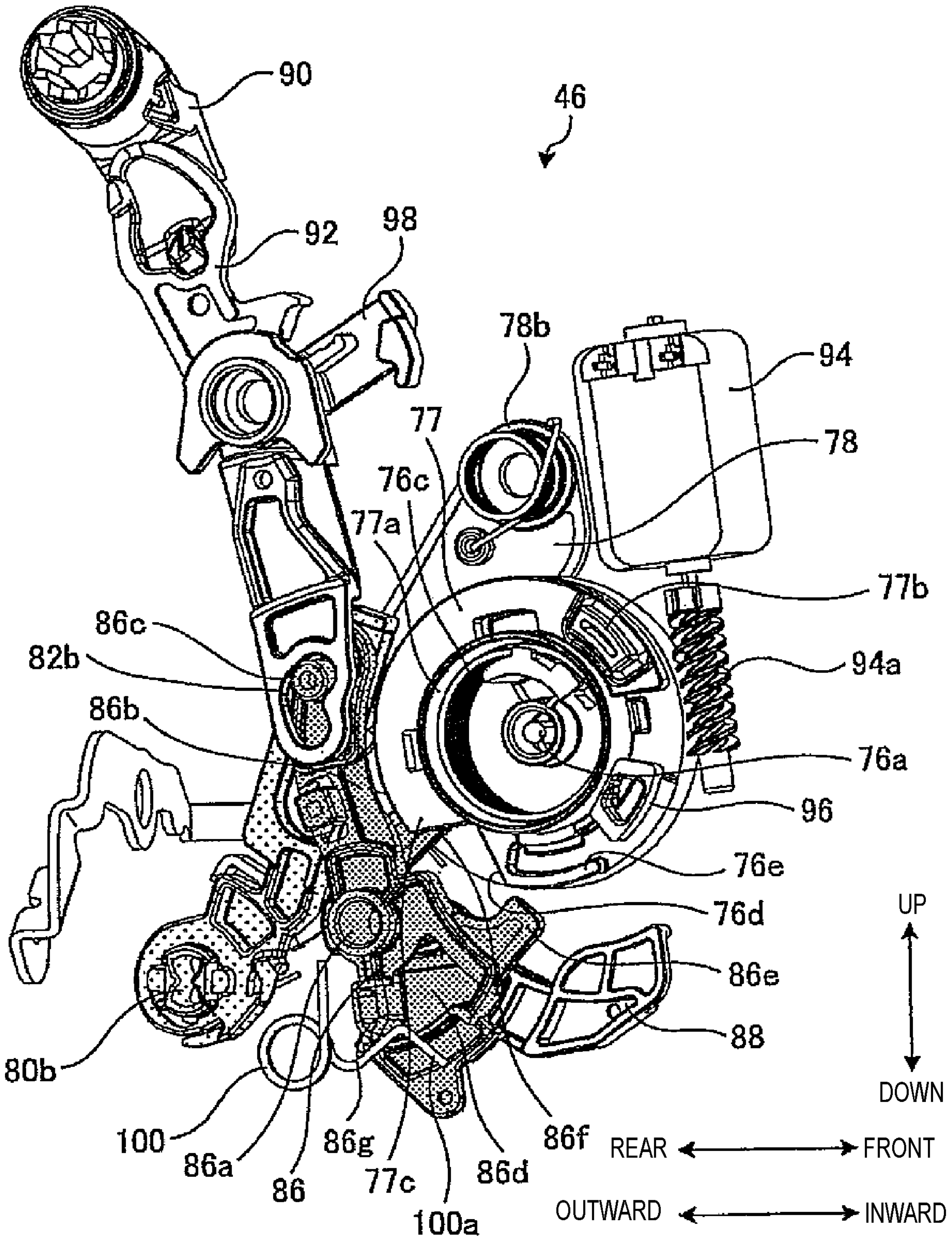
FIG. 6 is a perspective view of the lock mechanism as viewed diagonally from the outside front.

FIG. 5 is a perspective view of the lock mechanism 46 as viewed diagonally from the inside rear, and FIG. 6 is a perspective view of the lock mechanism 46 as viewed diagonally from the outside front. In FIG. 5, the case 20 is briefly illustrated together so that the arrangement of the lock mechanism 46 can be understood. In FIGS. 5 and 6, the lock mechanism 46 is in the locked state.

As illustrated in FIGS. 5 and 6, the lock mechanism 46 includes the cam ring 76 pivotally supported by a shaft portion 76*a*, a cam lever 78 pivotally supported by a shaft portion 78*a* and driven by the cam ring 76, the open link 80 driven by the cam lever 78, a sub lock lever 82 which is interlocked with the open link 80, and an open lever 84 pivotally supported by a shaft portion 84*a* and driven by the cam ring 76. The lock mechanism 46 further includes a lock lever 86 and an auxiliary lever 88 which are interlocked with the sub lock lever 82 and a key lever 90 and a sub key lever 92 which are interlocked with a key operation to drive the sub lock lever 82. In each figure, the lock lever 86 is illustrated in a dark dot area and the open link 80 is illustrated in a light dot area to facilitate component identification.

The cam ring 76 has a disk shape and is rotated by driving teeth provided on an outer peripheral surface by a worm 94*a* of a rotation shaft of the motor 94. Illustration of the teeth is omitted. The motor 94 is placed in the electric component area 42 (see FIG. 3). As for a rotation direction of the cam ring 76, a clockwise direction is a forward rotation and a counterclockwise direction is a reverse rotation with reference to FIG. 5.

The cam ring 76 includes a cam 76*b*. The cam 76*b* has a shape in which a diameter gradually increases over approximately 270° in the counterclockwise direction from directly below the shaft portion 76*a* when the cam ring 76 is in a reference position. The cam 76*b* approaches a radius of the cam ring 76 at a position of approximately 270° and the diameter is maintained up to approximately 180° in the counterclockwise direction.

As illustrated in FIG. 6, the cam ring 76 is provided with an auxiliary component 77 on an inner surface. The cam ring 76 and the auxiliary component 77 are fixed and are substantially one component. A spring 76*c* is provided inside a cylinder 77*a* formed by the auxiliary component 77. The spring 76*c* is urged so that the cam ring 76 is in a neutral reference position. The cam ring 76 can be rotated forward and reversely from the reference position against the spring 76*c* by the operation of the motor 94.

The auxiliary component 77 includes a protrusion 77*b* protruding inward in a vicinity of an outer periphery and a first inclined wall 77*c* provided on a substantially opposite side to the protrusion 77*b*. When the cam ring 76 is rotated reversely, the protrusion 77*b* abuts on an elastic stopper 96 provided in the case 20 (see FIG. 2) to restrict rotation of the cam ring 76. The first inclined wall 77*c* is formed so that a width increases along the counterclockwise direction from a cylindrical surface of the cylinder 77*a* in a radial direction.

The cam ring 76 further includes a second inclined wall 76*d* and a holding wall 76*e*. The second inclined wall 76*d* is formed so as that a width increases along the clockwise direction from a cylindrical surface of the cylinder 77*a* in a radial direction. The first inclined wall 77*c* and the second inclined wall 76*d* are formed so as to face each other at close positions and the inclinations thereof are opposite to each other. The first inclined wall 77*c* is arranged further on an outer side than the second inclined wall 76*d*. The holding wall 76*e* is provided slightly further on a counterclockwise side than the second inclined wall 76*d* and is an arc-shaped wall protruding outward along a peripheral surface of the cam ring 76. As illustrated in FIG. 6, a clockwise side of the holding wall 76*e* is closed and a counterclockwise side is open.

Returning to FIG. 5, a lower surface 78*d* of the cam lever 78 abuts on the cam 76*b*, and when the cam ring 76 rotates, the cam lever 78 is driven by the cam 76*b* and swung counterclockwise against a spring 78*b*. A knob 78*c* at a tip of the cam lever 78 is fitted in a side surface guide groove 80*a* of the open link 80, and when the cam lever 78 is swung clockwise, the open link 80 in an inclined state is made upright.

The deformed hole 80*b* is formed at a lower end portion of the open link 80. The acting portion 34*b* of the outer lever 34 (see FIG. 4) is inserted into the deformed hole 80*b* and the open link 80 is lifted upward by the operation of the outer lever 34. The anti-panic lever 58 is attached to the lower end portion of the open link 80 and the anti-panic lever 58 integrally moves up and down and tilts with the open link 80.

The open link 80 is a component which can be switched between the lock position in a tilted posture (in a posture illustrated in FIG. 5) and the unlock position in an upright posture (see (b) of FIG. 8) by the cam lever 78. When the open link 80 is in the lock position, the lock mechanism 46 is in a locked state, and when the open link 80 is in the unlock position, the lock mechanism 46 is in an unlocked state. The position of the open link 80 can be also switched by the lock lever 86.

That is, when the open link 80 is in the lock position, even when the anti-panic lever 58 is lifted by the outer lever 34, the anti-panic lever 58 (see FIG. 4) is tilted together with the open link 80, so that the anti-panic lever 58 does not abut on the ratchet lever 56 (see FIG. 4), that is, the anti-panic lever 58 is idly swung. Therefore, the ratchet lever 56 does not operate and the door is in the locked state while the door is closed.

On the other hand, when the open link 80 is in the unlock position, when the anti-panic lever 58 is lifted by the outer lever 34, the anti-panic lever 58 also stands upright with the open link 80, so that the anti-panic lever 58 abuts on the ratchet lever 56 and is pushed up. Therefore, the ratchet lever 56 operates and the door is in the unlocked state in which the door can be opened.

The sub lock lever 82 is pivotally supported by the shaft portion 82*a* and is swingable. The sub lock lever 82 is swung and driven by the key lever 90 and the sub key lever 92 so that the open link 80 can be switched between the lock position and the unlock position. That is, the sub lock lever 82 can be switched between the locked state and the unlocked state. When the sub lock lever 82 swings counterclockwise under the action of the key lever 90 and the sub key lever 92, an upper part of the open link 80 is pushed out from the sub lock lever 82 via an inner knob 86*i* (see FIG. 7(*d*)) of the lock lever 86 and swings clockwise to reach the unlock position. When the sub lock lever 82 swings clockwise and returns to the original position, an elastic force of the spring 78*b* is transmitted by the cam lever 78, and thus the open link 80 swings counterclockwise to reach the lock position. An arm 98 protruding forward from the shaft portion 82*a* is provided in an upper portion of the sub lock lever 82. The arm 98 is used as a means for identifying whether the lock mechanism 46 is in the locked state or the unlocked state and performs a switching operation of a first lock position switch 106 and a second lock position switch 108 (see FIG. 3), which will be described below.

The open lever 84 is a component used for opening a door based on an electric release, that is, a switch operation by a driver or the like. The open lever 84 includes a cam passive portion 84*b* protruding forward and a ratchet operating portion 84*c* protruding rearward and is urged clockwise by a spring 84*d*. When the cam ring 76 rotates forward, the cam 76*b* pushes down the cam passive portion 84*b* and the open lever 84 rotates counterclockwise around the shaft portion 84*a* against the spring 84*d*, and thus the ratchet operating portion 84*c* rises. As the ratchet operating portion 84*c* rises, the passive portion 56*a* of the ratchet lever 56 is pushed up and the latch mechanism 44 becomes unlatch, and thus the door is opened. When the cam ring 76 returns to the reference position, the open lever 84 also returns to a reference posture by the spring 84*d*.

The open lever 84 can operate the ratchet lever 56 independently of the open link 80. Therefore, according to the open lever 84, the door can be opened based on the electric release means even when the lock mechanism 46 is in the locked state (that is, the open link 80 is in the lock position).

As illustrated in FIG. 6, the lock lever 86 is pivotally supported by a shaft portion 86*a* and includes an arm 86*b* extending upward, an outer knob 86*c* protruding outward from a tip of the arm 86*b*, a first protrusion 86*e* protruding forward from a downward extending portion 86*d*, a second protrusion 86*f* protruding forward from a vicinity of the shaft portion 86*a*, a spring receiving portion 86*g* protruding outward from the downward extending portion 86*d*, and two pushing portions 86*h*. The outer knob 86*c* is fitted into a guide hole 82*b* formed at a lower end of the sub lock lever 82. When the sub lock lever 82 is swung, the lock lever 86 is swung by the outer knob 86*c*. The lock lever 86 can be displaced to an action position for switching the open link 80 from the lock position to the unlock position and a non-action position in which the open link 80 is not switched. The lock lever 86 is driven by the cam ring 76 or the sub lock lever 82.

The spring receiving portion 86*g* abuts on a bent portion 100*a* of a spring 100, and the sub lock lever 82 swings, and thus the spring receiving portion 86*g* is placed in either the lock position or the unlock position by riding over the bent portion 100*a* while elastically deforming the bent portion 100*a*. As a result, the sub lock lever 82 may take either the locked posture illustrated in FIG. 6 or the unlocked posture (see FIG. 8(*b*)).

The first protrusion 86*e* is pushed out by the first inclined wall 77*c*. As a result, the lock lever 86 rotates clockwise. The second protrusion 86*f* is pushed out by the second inclined wall 76*d*. As a result, the lock lever 86 rotates counterclockwise. The second protrusion 86*f* can enter a gap between a side surface of the cam ring 76 and the first inclined wall 77*c*. The two pushing portions 86*h* support the auxiliary lever 88 from below.

As illustrated in FIG. 5, the auxiliary lever 88 is pivotally supported by the shaft portion 86*a* like the lock lever 86 and includes an arm 88*a* protruding forward and an arc protrusion 88*b* provided above a tip of the arm 88*a*. The arc protrusion 88*b* has a shape which can be engaged with the holding wall 76*e* (see FIG. 6). The auxiliary lever 88 is urged counterclockwise with respect to the lock lever 86 by a spring 88*c* and a lower surface of the auxiliary lever 88 abuts on the pushing portion 86*h* to be supported.

Next, the action of the lock mechanism 46 will be described.

Figures 7A, 7B, 7C, 7D, 7E, 7F:
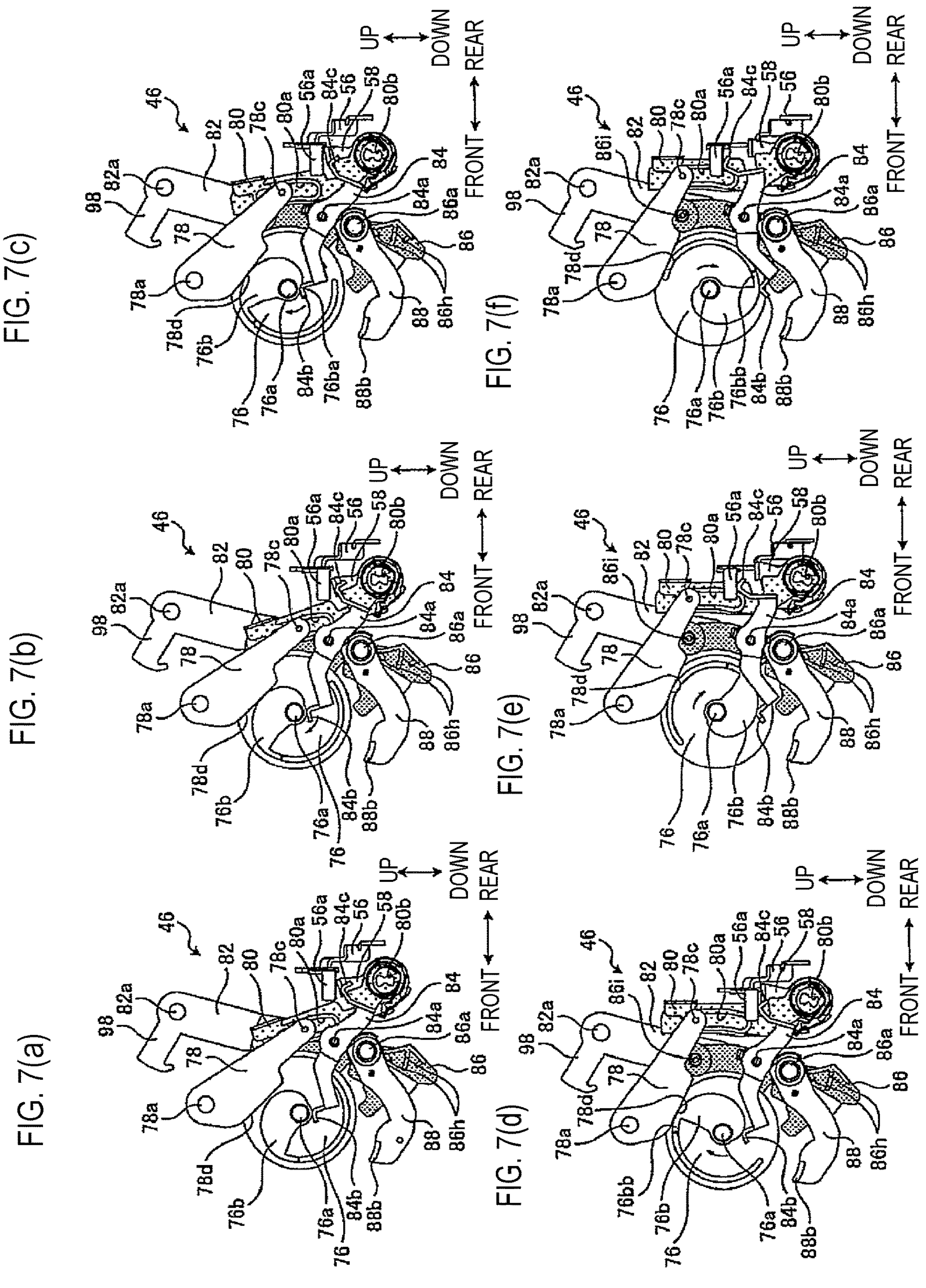
FIGS. 7(*a*)-7(*f*) show views for explaining an operation of the lock mechanism when a cam ring rotates forward, in which FIG. 7(*a*) is a view illustrating a basic state in which the cam ring is in a reference position, FIG. 7(*b*) is a view illustrating a state in which the cam ring is slightly rotated forward from the reference position, FIG. 7(*c*) is a view illustrating a state in which the cam ring is rotated forward by approximately 40° from the reference position, FIG. 7(*d*) is a view illustrating a state in which the cam ring is rotated forward by approximately 90° from the reference position, FIG. 7(*e*) is a view illustrating a state in which the cam ring is rotated forward by approximately 190° from the reference position, and FIG. 7(*f*) is a view illustrating a state in which the cam ring is rotated forward by approximately 250° from the reference position.
Figure 8A:
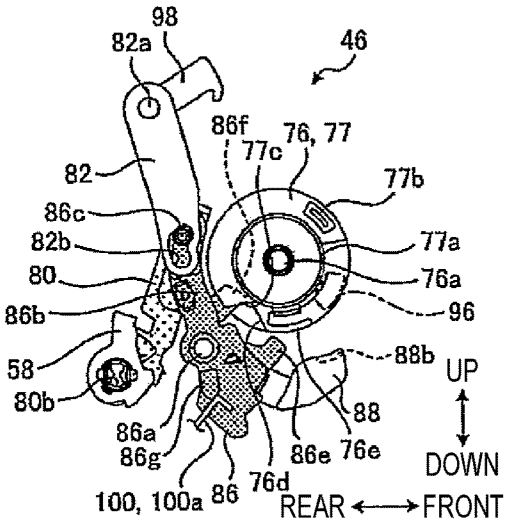
FIGS. 8(*a*)-8(*d*) views for explaining the operation of the lock mechanism when the cam ring rotates reversely and rotates forward, in which FIG. 8(*a*) is a view illustrating a basic state in which the cam ring is in the reference position, FIG. 8(*b*) is a view illustrating a state in which the cam ring is rotated reversely by approximately 40° from the reference position, FIG. 8(*c*) is a view illustrating a state in which the cam ring is rotated forward by approximately 40° from the state of FIG. 8(*b*), and FIG. 8(*d*) is a view illustrating a state in which the cam ring is rotated forward by approximately 40° from the state of FIG. 8(*c*).
Figure 8B:
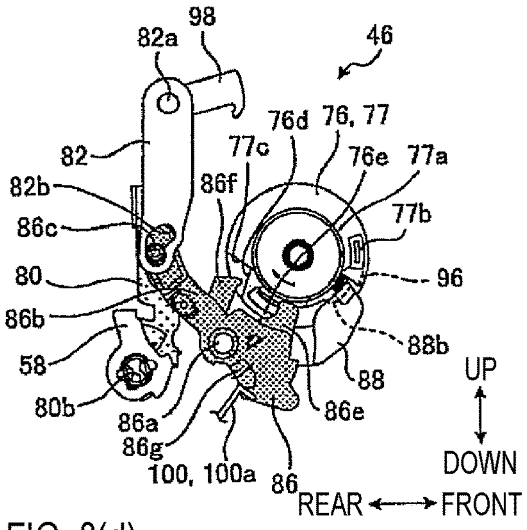
Figure 8C:
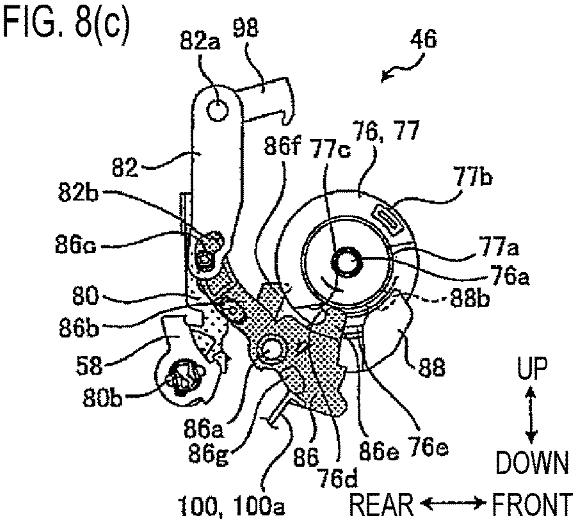
Figure 8D:
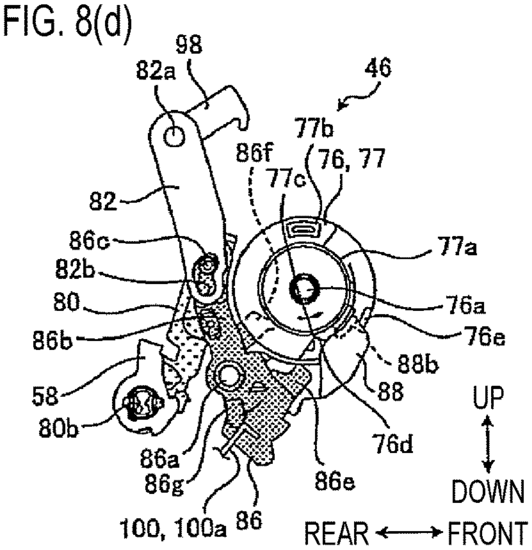

FIGS. 7(*a*)-7(*f*) show views for explaining an operation of the lock mechanism 46 when the cam ring 76 rotates forward, in which FIG. 7(*a*) is a view illustrating a basic state in which the cam ring 76 is in the reference position, FIG. 7(*b*) is a view illustrating a state in which the cam ring 76 is slightly rotated forward from the reference position, FIG. 7(*c*) is a view illustrating a state in which the cam ring 76 is rotated forward by approximately 40° from the reference position, FIG. 7(*d*) is a view illustrating a state in which the cam ring 76 is rotated forward by approximately 90° from the reference position, FIG. 7(*e*) is a view illustrating a state in which the cam ring 76 is rotated forward by approximately 190° from the reference position, and FIG. 7(*f*) is a view illustrating a state in which the cam ring 76 is rotated forward by approximately 250° from the reference position. FIGS. 7(*a*)-7(*f*) show views of the lock mechanism 46 as viewed from the inside and the forward rotation of the cam ring 76 is the clockwise direction.

From the basic state illustrated in FIG. 7(*a*), the cam ring 76 rotates forward by the action of the motor 94. As illustrated in FIG. 7(*b*), when the cam ring 76 rotates slightly, the cam 76*b* abuts on the lower surface 78*d* of the cam lever 78 and begins to drive the cam lever 78 counter-clockwise. As illustrated in FIG. 7(*c*), when the cam ring 76 is rotated by approximately 40°, a radius expansion start portion 76*ba* of the cam 76*b* abuts on the cam passive portion 84*b* of the open lever 84 and begins to drive the open lever 84 counterclockwise. As illustrated in FIG. 7(*d*), when the cam ring 76 is rotated by approximately 90°, a maximum diameter arc portion 76*bb* of the cam 76*b* reaches the lower surface 78*d* of cam lever 78 and the cam lever 78 is maximally displaced counterclockwise, and thereafter the maximum displacement is maintained until the state illustrated in FIG. 7(*f*). When the cam lever 78 is maximally displaced, the open link 80 is pushed out and swung by the knob 78*c* to reach the unlatch position. However, in this case, the sub lock lever 82, the lock lever 86, and the auxiliary lever 88 do not operate and maintain the posture illustrated in FIG. 7(*a*).

Further, when the open lever 84 rotates counterclockwise, the ratchet operating portion 84*c* abuts on the passive portion 56*a* of the ratchet lever 56 and pushes the passive portion 56*a* up. When the passive portion 56*a* is pushed up, the ratchet lever 56 begins to pivot about the axis.

As illustrated in FIG. 7(*e*), when the cam ring 76 is rotated by approximately 190°, the open lever 84 is driven counterclockwise and the ratchet operating portion 84*c* pushes up the passive portion 56*a* of the ratchet lever 56. Approximately at this point, the open lever 84 begins to act on the ratchet holder 54 (see FIG. 4) and the unlatch operation is started.

As illustrated in FIG. 7(*f*), when the cam ring 76 is rotated by approximately 250°, the maximum diameter arc portion 76*bb* of the cam 76*b* reaches the cam passive portion 84*b* and the open lever 84 is displaced to the maximum counterclockwise, and thus the passive portion 56*a* of the ratchet lever 56 is pushed up sufficiently and the latch mechanism 44 unlatches the striker. As a result, the door is opened. Then, by stopping the power supply to the motor 94, the cam ring 76 pivots counterclockwise by the action of the spring 76*c* (see FIG. 6) and the lock mechanism 46 returns to the basic state illustrated in FIG. 7(*a*).

At the time of such electric release, as illustrated in FIGS. 7(*a*)-7(*f*), the striker can be unlatched by rotating the open lever 84 under the action of the motor 94 and acting on the latch mechanism 44.

FIGS. 8(*a*)-8(*d*) views for explaining the operation of the lock mechanism 46 when the cam ring 76 rotates reversely and rotates forward, in which FIG. 8(*a*) is a view illustrating the basic state in which the cam ring 76 is in the reference position, FIG. 8(*b*) is a view illustrating a state in which the cam ring 76 is rotated reversely by approximately 40° from the reference position, FIG. 8(*c*) is a view illustrating a state in which the cam ring 76 is rotated forward by approximately 40° from the state of FIGS. 8(*b*) and 8(*d*) is a view illustrating a state in which the cam ring 76 is rotated forward by approximately 40° from the state of FIG. 8(*c*) shows views of the lock mechanism 46 as viewed from the outside and the reverse rotation of the cam ring 76 is the clockwise direction.

From the basic state illustrated in FIG. 8(*a*), the cam ring 76 is rotated reversely by the action of the motor 94. As illustrated in of FIG. 8(*b*), when the cam ring 76 is rotated reversely by approximately 40°, the second inclined wall 76*d* of the cam ring 76 presses the second protrusion 86*f*. As a result, the lock lever 86 pivots counterclockwise and the spring receiving portion 86*g* rides over the bent portion 100*a* of the spring 100 and is displaced to a predetermined tilted position. As the lock lever 86 pivots, the sub lock lever 82 is driven by the outer knob 86*c* and pivots clockwise and the open link 80 is driven by an inner knob 86*i* and pivots counterclockwise, and further the auxiliary lever 88 is driven by the pushing portion 86*h* (see FIG. 5) and pivots counterclockwise. As a result, the sub lock lever 82 and the open link 80 are in the unlock position and the arc protrusion 88*b* of the auxiliary lever 88 is displaced to a position close to the cylinder 77*a*.

As illustrated in FIG. 8(*c*), when the cam ring 76 rotates forward by approximately 40° from the state of FIG. 8(*b*), the cam ring 76 returns to the position illustrated in FIG. 8(*a*). However, since the spring receiving portion 86*g* is held by the bent portion 100*a*, the lock lever 86, the sub lock lever 82, and the open link 80 maintain the posture illustrated in FIG. 8(*b*). As a result, the lock mechanism 46 is in the unlocked state.

In this case, the arc protrusion 88*b* begins to engage with an inner diameter side surface of the holding wall 76*e* of the cam ring 76 and the auxiliary lever 88 maintains the posture illustrated in FIG. 8(*b*).

As illustrated in FIG. 8(*d*), when the cam ring 76 further rotates forward by approximately 40° from the state of FIG. 8(*c*), the first inclined wall 77*c* presses the first protrusion 86*e*. Therefore, the lock lever 86 pivots clockwise and the spring receiving portion 86*g* rides over the bent portion 100*a* of the spring 100 and returns to the position illustrated in FIG. 8(*a*). As the lock lever 86 pivots, the sub lock lever 82 is driven by the outer knob 86*c* and pivots counterclockwise and the open link 80 is driven by the cam lever 78 (see FIGS. 7(*a*)-7(*f*)) and pivots clockwise. As a result, each of the sub lock lever 82 and the open link 80 returns to the state illustrated in FIG. 8(*a*).

On the other hand, since the arc protrusion 88*b* is engaged with the inner diameter side surface of the holding wall 76*e* of the cam ring 76, the auxiliary lever 88 maintains the posture illustrated in FIG. 8(*d*). Then, when the cam ring 76 rotates further forward, a counterclockwise end portion of the arc protrusion 88*b* eventually abuts on a counterclockwise closed surface of the holding wall 76*e* and the rotation is restricted. This prevents excessive rotation of the cam ring 76. Then, when the cam ring 76 is rotated reversely to the position illustrated in FIG. 8(*a*), the engagement between the arc protrusion 88*b* and the holding wall 76*e* is released, so that the auxiliary lever 88 pivots clockwise by the elastic force of the spring 88*c*, and thus the auxiliary lever 88 returns to the position illustrated in FIG. 8(*a*). In this way, the lock mechanism 46 returns to the basic posture illustrated in FIG. 8(*a*) as a whole. In this way, in the door latch device 10, the single motor 94 can release meshing of the latch mechanism 44 and switch between the locked state of the lock mechanism 46 which disables the operation of the manual release means and the unlocked state which enables the operation of the manual release means.

Returning to FIG. 3, examples of the electric component in the door latch device 10 include a latch position switch 102 which detects the state of the latch 12, a key lever position switch 104 which detects a rotational state of the sub key lever 92, the first lock position switch 106 and the second lock position switch 108 which detect the state of the lock mechanism 46 via the arm 98, in addition to the motor 94 described above. The latch position switch 102 is configured such that the latch 12 of the latch mechanism 44 is switched between a half latch position and the full latch position.

Although the motor 94, the key lever position switch 104, the first lock position switch 106, and the second lock position switch 108 are collectively placed in the electric component area 42, the latch position switch 102 is connected to two bus bars 110*a* and 110*b* extending from the electric component area 42 in order to be placed in a vicinity of the latch 12. The bus bars 110*a* and 110*b* are held by a plate 112.

Figure 9:
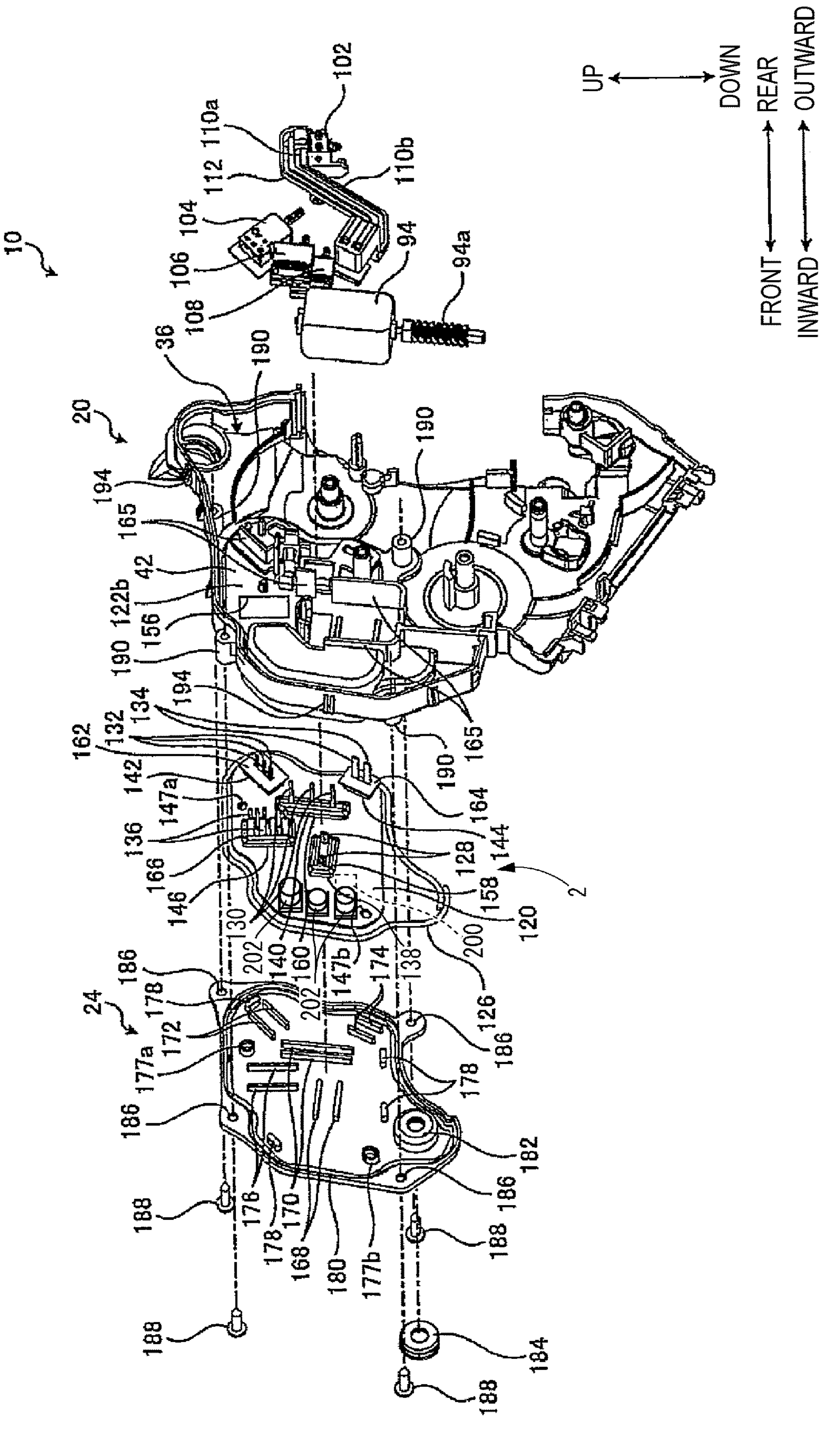
FIG. 9 is an exploded perspective view of an electric component, a component related to storage thereof, and the like as viewed diagonally from the outside front.
Figure 10:
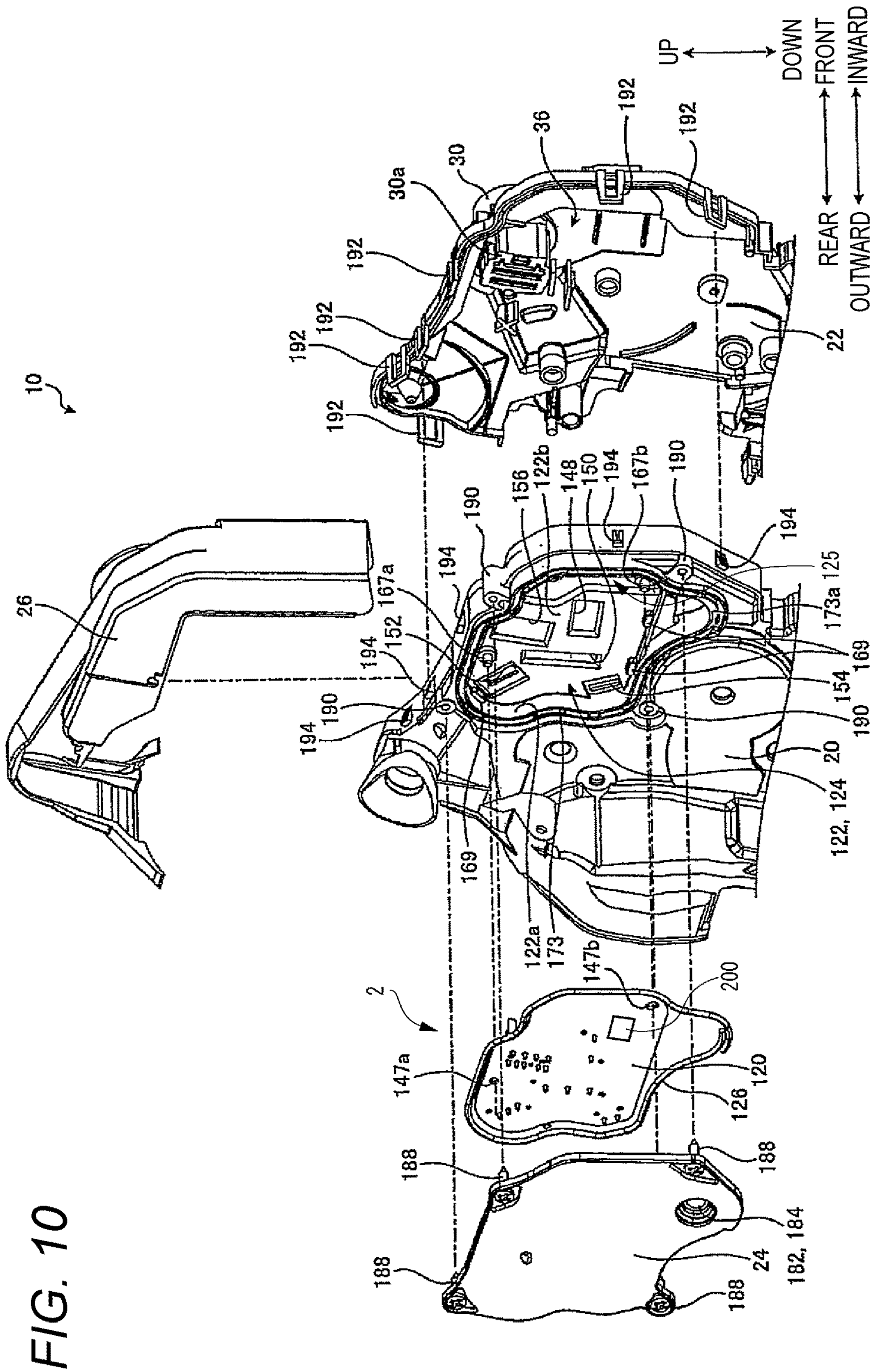
FIG. 10 is an exploded perspective view of the electric component, the component related to the storage thereof, and the like as viewed diagonally from the inside front.

FIG. 9 is an exploded perspective view of the electric component, a component related to storage thereof, and the like as viewed diagonally from the outside front, and FIG. 10 is an exploded perspective view of the electric component, the component related to the storage thereof, and the like as viewed diagonally from the inside front.

As illustrated in FIGS. 9 and 10, the door latch device 10 includes a door lock ECU 2 configured to control the motor 94. The door lock ECU 2 includes a printed wiring board 120, a microcomputer 200 arranged on the printed wiring board 120, and a capacitor 202 connected to the printed wiring board 120. The number of motors controlled by the door lock ECU 2 may be plural. A recess portion 122 is formed in an upper portion of an outer surface of the case 20 and in an area corresponding to a back side of the electric component area 42. The recess portion 122 forms the second accommodation space 124 by covering an outer surface with the second cover 24 described above. That is, in an upper portion of the case 20, the second accommodation space 124 is provided on the outer side with respect to a bottom plate 122*b* of the recess portion 122 and the first accommodation space 36 is provided on the inner side with respect to the bottom plate 122*b* of the recess portion 122. The door lock ECU 2 is accommodated in the second accommodation space 124. An external waterproof seal 126 is provided between an edge of the recess portion 122 in the case 20 and the second cover 24 and a space between the outside and the second accommodation space 124 is waterproofed. The external waterproof seal 126 is obtained by cutting a string-shaped sealing material to a predetermined length and does not require a special molded product. A lower end portion of the external waterproof seal 126 is arranged so as to slightly overlap.

The printed wiring board 120 includes pins 128, 130, 132, 134, and 136 (hereinafter, also collectively referred to as pins P) standing upright toward the outside, pin holders 138, 140, 142, 144, and 146 (hereinafter, also collectively referred to as pin holders H) which support the pins with respect to the printed wiring board 120 by covering circumferences of roots of the pins P, and two positioning holes 147*a* and 147*b*. The pin holder H has an appropriate strength and can press an internal waterproof seal B described below. Further, the pin holder H has an appropriate elasticity and has a sealing action with respect to the inserted pin P. The pin holder H is made of resin and is, for example, a molded product made of polyacetal.

Two pins 128 are connected to the motor 94. Three pins 130 are connected to the first lock position switch 106 and the second lock position switch 108. Three pins 132 are connected to the key lever position switch 104. Two pins 134 are connected to the latch position switch 102 via the bus bars 110*a* and 110*b*. There are several pins 136, which protrude inward from holes in a terminal wall 30*a* of the first cover 22 and become a part of the coupler 30. The pins P are soldered on a back surface of the printed wiring board 120.

The pin holder 138 holds the two pins 128 and the pin holder 140 holds the three pins 130 in series. The pin holder 142 holds the three pins 132 in series, the pin holder 144 holds the two pins 134, and the pin holder 146 holds the plurality of pins 136 in two rows.

The positioning hole 147*a* and the positioning hole 147*b* are provided at positions separated from each other. The positioning hole 147*a* is a round hole and the positioning hole 147*b* is an elongated hole pointing to the positioning hole 147*a*, and thus manufacturing errors of the positioning pins 167*a* and 167*b*, which will be described below, are allowed. The printed wiring board 120 has an irregular shape substantially along the second accommodation space 124.

Pin holes 148, 150, 152, 154, and 156 (hereinafter, also collectively referred to as pin holes A) are formed in the bottom plate 122*b* of the recess portion 122 in the case 20. The pin holes A communicate between the first accommodation space 36 and the second accommodation space 124. The pins 128, 130, 132, 134, and 136 protrude from the pin holes 148, 150, 152, 154, and 156 in order to the first accommodation space 36 and are inserted into pin connection holes provided in each electric component and electrically connected thereto. Each electric component is held by a holding wall 165 provided on an outer surface of the case 20. Rectangular and annular internal waterproof seals 158, 160, 162, 164, and 166 (hereinafter, collectively referred to as internal waterproof seals B) are provided in order between outer peripheral edges of the pin holders 138, 140, 142, 144, and 146 and the pin holes 148, 150, 152, 154, and 156. The internal waterproof seals B waterproof between the first accommodation space 36 and the second accommodation space 124. The second accommodation space 124 is waterproofed by the external waterproof seal 126 and the internal waterproof seal B and is suitable for accommodating the printed wiring board 120. The internal waterproof seal B is preferably a rectangular annular shape corresponding to the corresponding pin hole A, but depending on the conditions, a part of a non-annular body may be overlapped and used as in the external waterproof seal 126.

The bottom plate 122*b* is further formed with two positioning pins 167*a* and 167*b* and a plurality of inner substrate supporters 169. The positioning pins 167*a* and 167*b* are inserted into the positioning holes 147*a* and 147*b* and the printed wiring board 120 is positioned. The inner substrate supporter 169 is provided at a position along a circumference of the printed wiring board 120 and abuts on an inner surface of the printed wiring board 120.

A seal groove 173 is formed along an outer periphery of a peripheral wall 122*a* surrounding the recess portion 122. The external waterproof seal 126 is arranged in the seal groove 173. The seal groove 173 is formed with an overlapping groove 173*a* for arranging lower end portions of the external waterproof seal 126 in an overlapping manner.

Pairs of support protrusions 168, 170, 172, 174, and 176 are formed on the inner surface of the second cover 24. The support protrusions 168, 170, 172, 174, and 176 are provided at positions facing the pin holders 138, 140, 142, 144, and 146 in order with the printed wiring board 120 interposed therebetween.

Further, two positioning posts 177a and 177b, a plurality of outer substrate supporters 178, a seal pressing protrusion 180, and a permeable membrane holder 182 are formed on the inner surface of the second cover 24. A round hole is formed in the positioning post 177a, and an elongated hole pointing to the positioning post 177a is formed in the positioning post 177b. The positioning pins 167a and 167b which penetrate the positioning holes 147a and 147b are inserted into the holes of the positioning posts 177a and 177b and the second cover 24 is positioned.

The outer substrate supporters 178 are provided at positions along the circumference of the printed wiring board 120 and at positions facing the inner substrate supporters 169 via the printed wiring board 120. The outer substrate supporters 178 pinch and hold the printed wiring board 120 together with the inner substrate supporters 169. The inner substrate supporters 169 and the outer substrate supporters 178 are provided with the same cross-sectional shape and the same orientation so as to face each other.

The seal pressing protrusion 180 is a substantially annular thin protrusion along the seal groove 173 and presses the outer surface of the external waterproof seal 126. The external waterproof seal 126 exerts a sealing action by being pressed and sealed by the seal pressing protrusion 180.

The permeable membrane holder 182 is a cylindrical body protruding outward and has a hole at the tip. A permeable membrane filter 184 is attached to the permeable membrane holder 182 from the inside. The permeable membrane filter 184 can prevent the passage of water droplets and allow water vapor to pass through the pores, thereby preventing the second accommodation space 124 from being in a high humidity state. The permeable membrane holder 182 and the permeable membrane filter 184 are arranged in a space below the printed wiring board 120 in the second accommodation space 124.

A plurality of screw holes 186 are provided around the second cover 24 and the second cover 24 is fixed to the case 20 by screwing screws 188 passing through the screw holes 186 into screw posts 190 provided in the case 20.

A plurality of hooks 192 are provided around the first cover 22 and the first cover 22 is fixed to the case 20 by engaging the hooks 192 with claws 194 provided in the case 20. After the first cover 22 and the second cover 24 are attached to the case 20, the waterproof cover 26 is attached from above.

The first accommodation space 36 formed between the case 20 and the first cover 22 is not completely waterproof, but has a so-called drip-proof structure. The reason is that each component accommodated in the first accommodation space 36 has a drip-proof structure. On the other hand, as described above, the second accommodation space 124 has a waterproof structure by the external waterproof seal 126 and the internal waterproof seal B because precision electronic components and the like are mounted on the printed wiring board 120.

The microcomputer 200 includes a Central Processing Unit (CPU), a memory such as a ROM and a RAM, and an interface (I/F). The door lock ECU 2 is connected to a battery (for example, 12V battery) provided on a main body side of the vehicle via a harness connector (not illustrated) connected to the coupler 30 (see FIG. 1) and normally drives the motor 94 by the electric power from the battery. Signals from an inner unlatch switch and an inner lock switch provided inside the door, a signal from an outer unlatch switch provided outside the door, and the like are input to the door lock ECU 2. When a predetermined signal is input from the inner unlatch switch and the outer unlatch switch, the door lock ECU 2 unlocks the striker by the electric release means and opens the door. When a predetermined signal is input from the inner lock switch, the lock mechanism 46 is switched to the locked state or the unlocked state.

Figure 11:
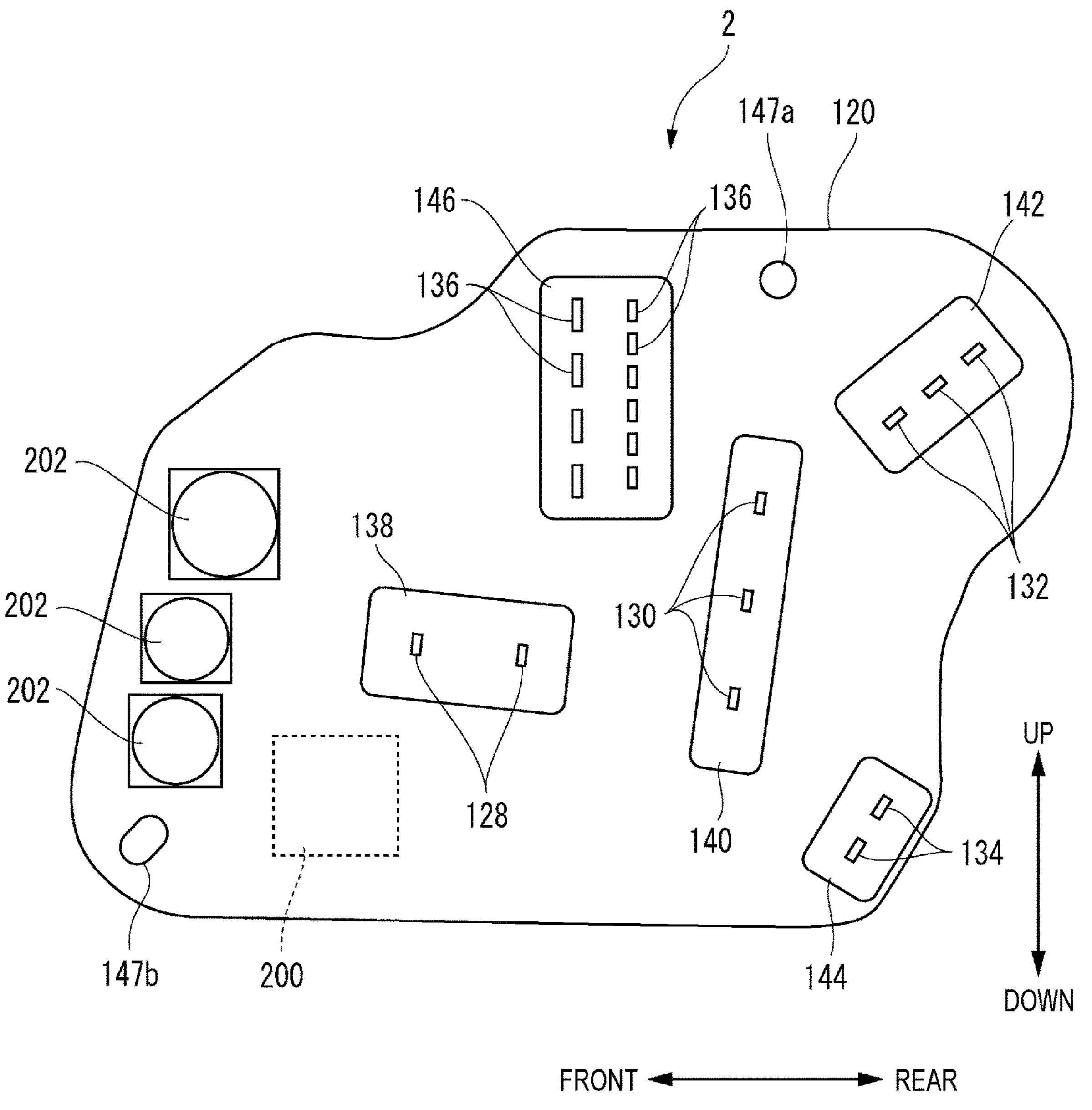
FIG. 11 is a front view of a printed wiring board on which a capacitor is mounted.
Figure 12:
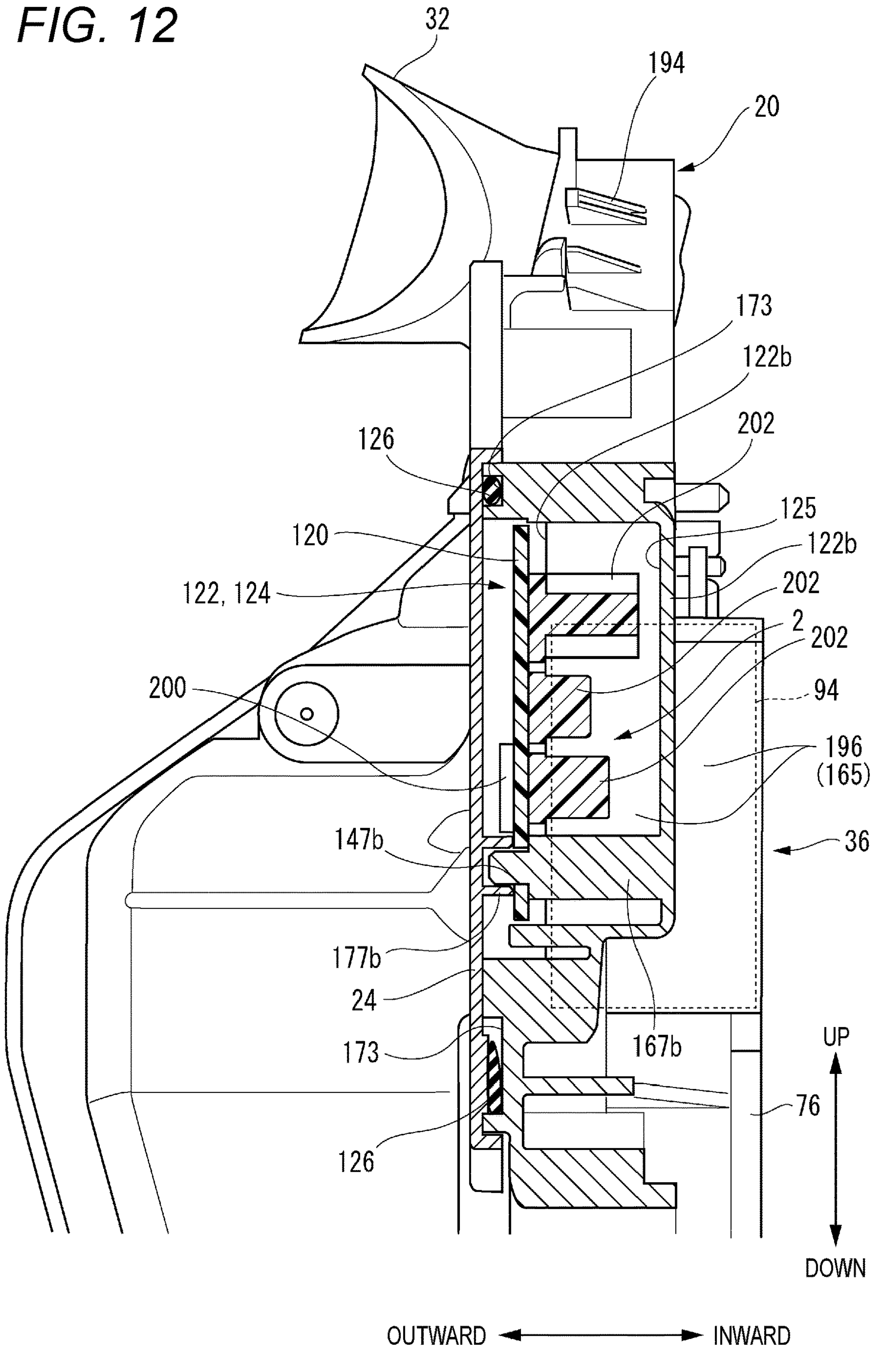
FIG. 12 is a cross-sectional view taken along a line A-A of FIG. 3.

Subsequently, the capacitor 202 provided on the printed wiring board 120 will be described in detail with reference to FIGS. 3, 11, and 12. FIG. 3 is a side view illustrating the inside of the door latch device 10 of FIG. 1 as described above. More specifically, FIG. 3 is a view of the inside of the door latch device 10 as seen from the inside of the vehicle along an inward-outward direction (a vehicle width direction of the vehicle). FIG. 11 is a front view of the printed wiring board 120 on which the capacitor 202 is mounted, and more specifically, is a view of the printed wiring board 120 as viewed from the inside of the vehicle. FIG. 12 is a cross-sectional view taken along the line A-A of FIG. 3, and more specifically, is a cross-sectional view taken along the line A-A of FIG. 3 as viewed from the front of the vehicle along the front-rear direction.

As illustrated in FIG. 11, in the printed wiring board 120, a capacitor 202 is arranged on a front upper portion of the inner surface. The number of capacitors 202 may be one, but it is preferable that a plurality of capacitors 202 are electrically connected in parallel. Rather than providing one capacitor with a large capacitance, using a plurality of capacitors improves the degree of freedom of arrangement. Furthermore, by connecting the plurality of capacitors in parallel electrically, the required capacitance can be covered by the total capacitance (combined capacitance) of the plurality of capacitors. In the embodiment, the printed wiring board 120 is provided with three capacitors 202.

The capacitors 202 are configured to be able to supply power to the motor 94 as an emergency power supply means. When the power cannot be properly supplied from the battery of the motor 94, such as in the event of a vehicle collision, the lock mechanism 46 is changed from the locked state to the unlocked state by the power stored in the capacitor 202. As a result, even when the lock mechanism 46 is in the unlocked state when the power supply from the battery is cut off, an occupant can go out of the vehicle by the release operation of the manual release mechanism.

As the capacitor 202, an electrolytic capacitor, a ceramic capacitor, a film capacitor, or the like can be adopted, and an electrolytic capacitor is preferable. The capacitor 202 only needs to be able to store enough electric power to change the lock mechanism 46 from the locked state to the unlocked state in an emergency. When the capacitance is extremely small, the lock mechanism 46 cannot be changed from the locked state to the unlocked state, and when the capacitance is extremely large, the capacitor 202 becomes large. The dischargeable time of the capacitor 202 is preferably 50 ms or more and 1 s or less, and more preferably 100 ms or more and 500 ms or less. The capacitance (combined capacitance in the case of a plurality) of the capacitor 202 is preferably 50 μF or more and 200 μF or less, and more preferably 80 μF or more and 150 μF or less.

The capacitor 202 is arranged together with the printed wiring board 120 in a capacitor accommodation portion 125 of the second accommodation space 124. The capacitor accommodation portion 125 is recessed in the recess portion 122 of the second accommodation space 124. More specifically, a part of the bottom plate 122b, which is a partition wall partitioning the first accommodation space 36 and the second accommodation space 124, protrudes from the second accommodation space 124 toward the first accommodation space 36 and the second accommodation space 124 becomes wider than the other areas, in such a manner that the capacitor accommodation portion 125 is formed. That is, the capacitor accommodation portion 125 of the second accommodation space 124 is wider in a width in the inward-outward direction than the other areas of the second accommodation space 124.

In this way, since the capacitors 202 having the relatively large volume are arranged in the capacitor accommodation portion 125 recessed from the second accommodation space 124 toward the first accommodation space 36, the door latch device 10 can be miniaturized. As a result, the door latch device 10 can be arranged in the door without obstructing a trajectory of a window glass. It is preferable that the capacitor 202 is arranged in the capacitor accommodation portion 125 so that a longitudinal direction faces the inward-outward direction. For example, when the capacitor 202 has a cylindrical shape, it is preferably arranged in the capacitor accommodation portion 125 so that a height direction of the cylinder faces the inward-outward direction.

Further, when viewed from the inward-outward direction as illustrated in FIG. 3, the capacitor 202 is arranged so as to be adjacent to the motor 94 with the holding wall 165 (hereinafter, the holding wall 165 will be referred to as a partitioning wall 196) on the front side which holds the motor 94 interposed between the capacitor 202 and the motor 94, and when viewed from the front-rear direction as illustrated in FIG. 12, the capacitors 202 are arranged so that at least a part of the capacitors 202 overlaps with the motor 94 in the inward-outward directions. In this way, the motor 94 and the capacitors 202, which have a large volume, are arranged in a staggered state so as to be adjacent to each other when viewed from the inward-outward direction and at least a part of the motor 94 and the capacitors 202 are arranged so as to overlap each other when viewed from the front-rear direction. As a result, a size (width in the inward-outward direction) of the door latch device in the height direction of the partitioning wall 196 can be further suppressed.

Further, the capacitors 202 and the mechanical mechanism 38 are arranged on opposite sides with the motor 94 interposed between the capacitors 202 and the mechanical mechanism 38 when viewed from the inward-outward direction as illustrated in FIG. 3. That is, the capacitors 202 are arranged in front of the motor 94 and the mechanical mechanism 38 is arranged behind the motor 94. In this way, by arranging the capacitors 202 on the opposite side to the mechanical mechanism 38, which has a large number of components, with the motor 94 interposed between the capacitors 202 and the mechanical mechanism 38, the size (width in the inward-outward direction) of the door latch device 10 in the height direction of the partitioning wall 196 can be further suppressed.

Although various embodiments are described above with reference to the drawings, it goes without saying that the invention is not limited to such examples. It is clear that a person skilled in the art can come up with various change examples or modification examples within the scope of the claims and it is naturally understood that these also belong to the technical scope of the invention. Further, components in the above-described embodiment may be arbitrarily combined as long as the gist of the invention is not deviated.

For example, in the embodiment described above, the capacitor 202 is exemplified as a storage body, but the storage body is not limited to the capacitor 202 and a capacitor having no dielectric may be used.

Further, the capacitor accommodation portion 125 of the embodiment is formed so as to be longer in an up-down direction than in the front-rear direction, but the invention is not limited to this. The capacitor accommodation portion 125 may be formed so as to be longer in the front-rear direction than in the up-down direction or a plurality of capacitor accommodation portions 125 may be provided. In the embodiment, by arranging a plurality of capacitors 202 in a single capacitor accommodation portion 125, it is possible to prevent the structure of the printed wiring board 120 from becoming complicated.

In addition, at least the following matters are described in this specification. The components and the like corresponding to those of the embodiments described above are shown in parentheses, but the invention is not limited thereto.

(1) A door latch device (door latch device 10) which is provided in a door of a vehicle and closes and opens the door by latching and unlatching a striker provided on a main body side of the vehicle, the door latch device includes: a motor (motor 94); a mechanical mechanism (mechanical mechanism 38) which is driven by the motor; a door lock ECU (door lock ECU 2) for controlling the motor; and a case (case 20) for accommodating the motor, the mechanical mechanism, and the door lock ECU, in which the door lock ECU includes a printed wiring board (printed wiring board 120) and a power storage body (capacitor 202) connected to the printed wiring board, in which the case has: a partition wall (bottom plate 122*b*); a first accommodation space (first accommodation space 36) for accommodating the motor and the mechanical mechanism on one side of the partition wall; and a second accommodation space (second accommodation space 124) for accommodating the printed wiring board and the power storage body on the other side of the partition wall, in which the partition wall is provided with a power storage body accommodation portion (capacitor accommodation portion 125) recessed from the second accommodation space toward the first accommodation space, and in which the power storage body is placed in the power storage body accommodation portion.

According to (1), since the power storage body having a relatively large volume is placed in the power storage body accommodation portion recessed from the second accommodation space toward the first accommodation space, the door latch device can be miniaturized. As a result, it is possible to place the door latch device inside the door without obstructing the trajectory of the window glass.

(2) The door latch device according to (1), in which the power storage body and the motor are arranged so as to be adjacent to each other with a partitioning wall (partitioning wall 196) erected from the partition interposed between the power storage body and the motor when viewed from a first direction (inward-outward direction) orthogonal to the partition wall.

According to (2), the motor and the power storage body, which have a large volume, are arranged in a staggered state so as to be adjacent to each other when viewed from the first direction orthogonal to the partition wall, in such a manner that the size of the door latch device in the height direction of the partitioning wall can be suppressed.

(3) The door latch device according to (2), in which the mechanical mechanism includes: a latch mechanism (latch mechanism 44) for holding the door in a closed state; electric release means configured to release the latch mechanism by power of the motor; manual release means configured to release the latch mechanism by manual operation force and a lock mechanism (lock mechanism 46) which switches between a locked state which disables an operation of the manual release means and an unlocked state which enables the operation of the manual release means, and in which the power storage body is arranged on an opposite side to the mechanical mechanism with the motor interposed between the power storage body and the mechanical mechanism when viewed from the first direction.

According to (3), by arranging the power storage body on the opposite side to the mechanical mechanism having a large number of components with the motor interposed between the power storage body and the mechanical mechanism, the size of the door latch device in the height direction of the partitioning wall can be suppressed.

(4) The door latch device according to any one of (1) to (3), in which the power storage body and the motor are arranged so that at least parts of the power storage body and the motor overlap when viewed from a second direction (front-rear direction) parallel to the partition wall.

According to (4), by arranging the motor and the power storage body, which have a large volume, so that at least parts thereof overlap when viewed from the second direction parallel to the partition wall, the size of the door latch device in the height direction of the partitioning wall can be further reduced.

(5) The door latch device according to any one of (1) to (4), in which a plurality of the power storage bodies is arranged in the power storage body accommodation portion.

According to (5), by securing the capacitance with the plurality of power storage bodies rather than one power storage body having a large capacitance, the degree of freedom in arranging the power storage bodies is high and the door latch device can be miniaturized.

(6) The door latch device according to any one of (1) to (5), further includes: a first cover (first cover 22) which forms the first accommodation space by covering a surface on the one side of the partition wall; a second cover (second cover 24) which forms the second accommodation space by covering a surface on the other side of the partition wall; a pin hole (pin hole 148) which is provided in the partition wall and communicates between the first accommodation space and the second accommodation space; a pin (pin 128) which stands up from the printed wiring board and protrudes from the pin hole into the first accommodation space; a pin holder (pin holder 138) which supports the pin against the printed wiring board by covering a circumference of a root of the pin; an external waterproof seal (external waterproof seal 126) which is provided between the case and the second cover to waterproof a space between the outside and the second accommodation space; and an internal waterproof seal (internal waterproof seal 160) which is provided between the pin holder and the pin hole to waterproof a space between the first accommodation space and the second accommodation space.

According to (6), the entire surface of the printed wiring board and the power storage body can be waterproofed by the external waterproof seal and the internal waterproof seal.

(7) The door latch device according to (6), in which the motor is connected to the printed wiring board via the pin.

According to (7), by connecting the motor to the printed wiring board via the pin, even when the motor is placed in the first accommodation space with respect to the printed wiring board and power storage body placed in the second accommodation space, the deterioration of the waterproof function can be suppressed.

REFERENCE SIGNS LIST

2 Door lock ECU
10 Door latch device
20 Case
22 First cover
24 Second cover
38 Mechanical mechanism
44 Latch mechanism
46 Lock mechanism
94 Motor
120 Printed wiring board
**122*b*** Bottom plate (partition wall)
124 Second accommodation space
125 Capacitor accommodation portion
126 External waterproof seal
160 Internal waterproof seal
128 Pin
138 Pin holder
148 Pin hole
196 Partitioning wall
202 Capacitor (power storage body)

The invention claimed is:

1. A door latch device which is provided in a door of a vehicle and closes and opens the door by latching and unlatching a striker provided on a main body side of the vehicle, the door latch device comprising:
- a motor;
- a mechanical mechanism which is driven by the motor;
- a door lock ECU configured to control the motor; and
- a case surrounding the motor, the mechanical mechanism, and the door lock ECU,
- wherein the door lock ECU comprises a printed wiring board and a power storage body connected to the printed wiring board,
- wherein the case has:
  - a partition wall;
  - a first accommodation space accommodating the motor and the mechanical mechanism on a first side of the partition wall; and
  - a second accommodation space accommodating the printed wiring board and the power storage body on a second side of the partition wall, the second side being opposite to the first side,
- wherein the partition wall is provided with a power storage body accommodation portion protruding from the second accommodation space toward the first accommodation space,
- wherein the power storage body is placed in the power storage body accommodation portion,
- wherein the mechanical mechanism comprises:
  - a latch mechanism configured to hold the door in a closed state; and
  - an electric release mechanism configured to release the latch mechanism by power of the motor;
- wherein the power storage body is arranged on an opposite side to the mechanical mechanism with the motor interposed between the power storage body and the mechanical mechanism when viewed from a first direction orthogonal to the partition wall, and
- wherein the power storage body and the motor are arranged so that at least parts of the power storage body and the motor overlap when viewed from a second direction parallel to the partition wall.

2. The door latch device according to claim 1,
- wherein the power storage body and the motor are arranged so as to be adjacent to each other with a partitioning wall erected from the partition interposed between the power storage body and the motor when viewed from the first direction.

3. The door latch device according to claim 2,
- wherein the mechanical mechanism further comprises:

a manual release mechanism configured to release the latch mechanism by manual operation force; and a lock mechanism which switches between a locked state which disables an operation of the manual release mechanism and an unlocked state which enables the operation of the manual release mechanism.

4. The door latch device according to claim 1, wherein a plurality of the power storage bodies is arranged in the power storage body accommodation portion.

5. The door latch device according to claim 1, further comprising:

a first cover which forms the first accommodation space by covering a surface on the first side of the partition wall;

a second cover which forms the second accommodation space by covering a surface on the second side of the partition wall;

a pin hole which is provided in the partition wall and communicates between the first accommodation space and the second accommodation space;

a pin which stands up from the printed wiring board and protrudes from the pin hole into the first accommodation space;

a pin holder configured to support the pin against the printed wiring board by covering a circumference of a root of the pin;

an external waterproof seal which is provided between the case and the second cover to waterproof a space between the outside and the second accommodation space; and an internal waterproof seal which is provided between the pin holder and the pin hole to waterproof a space between the first accommodation space and the second accommodation space.

6. The door latch device according to claim 5, wherein the motor is connected to the printed wiring board via the pin.

* * * * *